United States Patent [19]
Hine

[11] Patent Number: 6,099,039
[45] Date of Patent: Aug. 8, 2000

[54] FRAME STRUCTURE FOR SPORT UTILITY VEHICLE OR LIGHT TRUCK

[76] Inventor: Alan Hine, 1830 Kent Rd., Ortonville, Mich. 48462

[21] Appl. No.: 08/814,003

[22] Filed: Mar. 10, 1997

[51] Int. Cl.[7] .................................................. B62D 21/02
[52] U.S. Cl. .......................... 280/781; 296/197; 296/204; 180/311
[58] Field of Search ..................................... 280/781, 785, 280/797, 798, 800, 791, 792, 788; 180/311, 312; 296/204, 203.02, 203.04, 197

[56] References Cited

U.S. PATENT DOCUMENTS

| | | | |
|---|---|---|---|
| 1,435,354 | 11/1922 | Weaver | 280/781 |
| 2,627,426 | 2/1953 | Toncray et al. | 280/781 |
| 3,131,963 | 5/1964 | Schilberg . | |
| 3,243,007 | 3/1966 | Berckhan . | |
| 3,328,048 | 6/1967 | Hoglund et al. | 280/781 |
| 3,819,224 | 6/1974 | Casey et al. . | |
| 3,827,525 | 8/1974 | Felzer . | |
| 4,205,872 | 6/1980 | Bollinger . | |
| 4,422,685 | 12/1983 | Bonfilio et al. . | |
| 4,440,435 | 4/1984 | Norlin . | |
| 4,618,023 | 10/1986 | Norlin | 280/781 |
| 4,730,870 | 3/1988 | DeRees . | |
| 4,881,756 | 11/1989 | Kumasaka et al. | 280/785 |
| 4,909,565 | 3/1990 | Harasaki et al. . | |
| 5,002,309 | 3/1991 | Vecellio . | |
| 5,071,188 | 12/1991 | Thum . | |
| 5,332,281 | 7/1994 | Janotik et al. . | |
| 5,338,080 | 8/1994 | Janotik et al. . | |
| 5,374,081 | 12/1994 | Schoderer et al. . | |
| 5,401,056 | 3/1995 | Eastman . | |
| 5,882,064 | 3/1999 | Emmons | 296/197 |

FOREIGN PATENT DOCUMENTS

| | | | |
|---|---|---|---|
| 0 142 581 | 5/1985 | European Pat. Off. . | |
| 0 568 251 | 12/1996 | European Pat. Off. . | |
| 0 291 385 | 11/1998 | European Pat. Off. . | |
| 31 46 554 | 7/1982 | Germany . | |
| 43 18 226 | 12/1994 | Germany . | |
| 2-164675 | 6/1990 | Japan | 280/785 |
| 5-58338 | 3/1993 | Japan | 280/785 |

*Primary Examiner*—Peter C. English

[57] ABSTRACT

Improved structural and operational components for sport utility vehicles (SUVs) and light truck vehicles. A hybrid vehicle structure utilizing structural subframes in the front and rear of the vehicle and a monocoque body structure in the center. A common subframe system is used for the front ends of both the sport utility vehicles and light truck vehicles. In addition, substantially the same subframe system is used for the rear end of the sports utility vehicle. A common suspension system is also used for the front ends of the SUVs and light truck vehicles. The same suspension system is also used for the rear end of the SUV. Use of common components and subsystems create significant savings in tooling and assembly costs. At the same time, the present invention maintains performance characteristics of the SUVs and light truck vehicles comparable to or exceeding the characteristics of SUVs and light truck vehicles in the same class. Triangular support framing structures are also used in the SUVs to provide optimum loading through the roof rail members. A common body structure, preferably a monocoque structure, is used for all of the vehicles from the "B" pillar forward. With the present invention, existing production plants and tooling can be utilized and the SUVs and light truck structures can be assembled on the same production line.

6 Claims, 18 Drawing Sheets

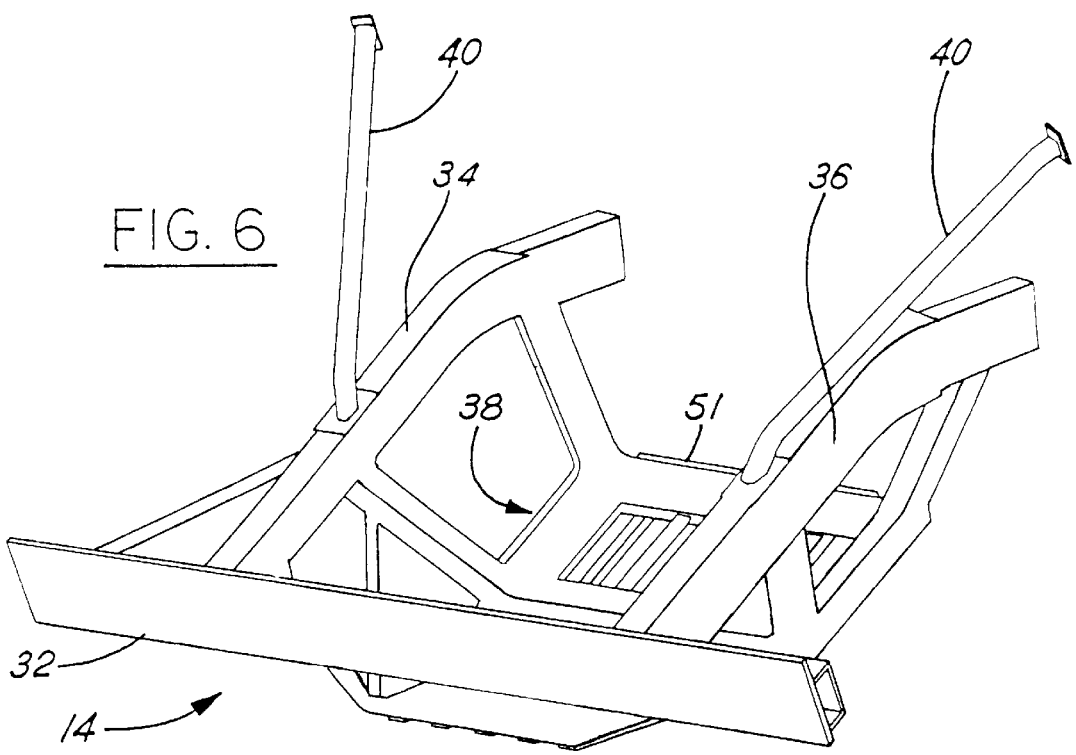
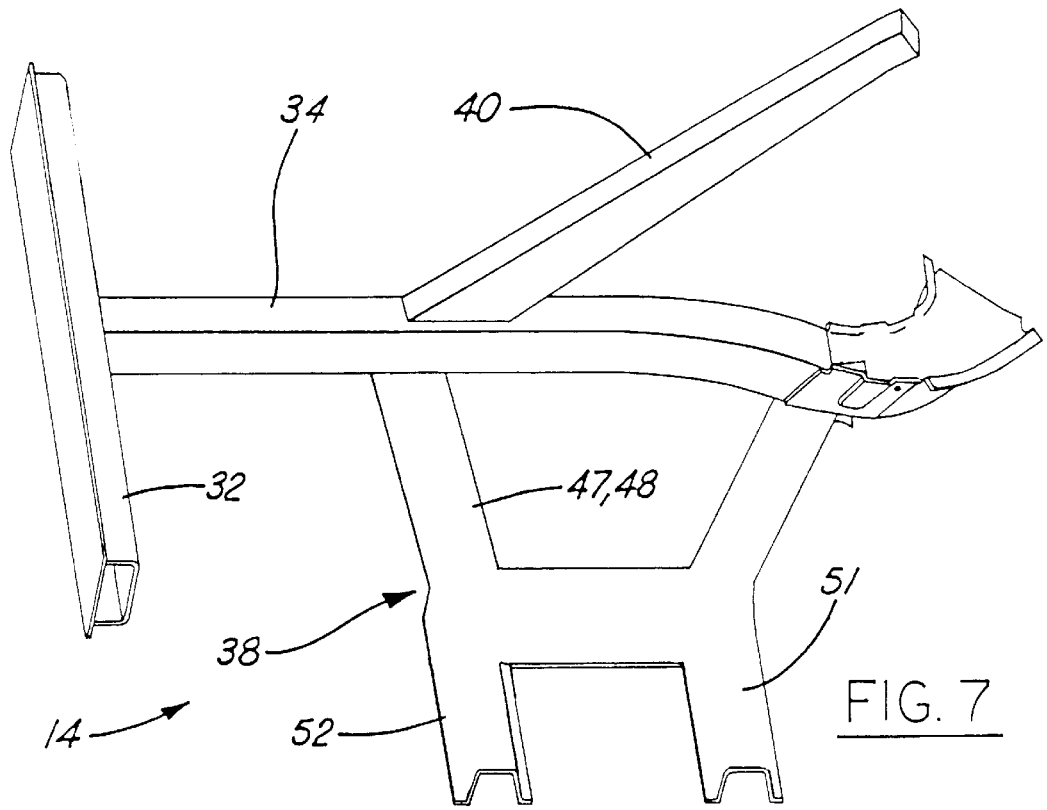

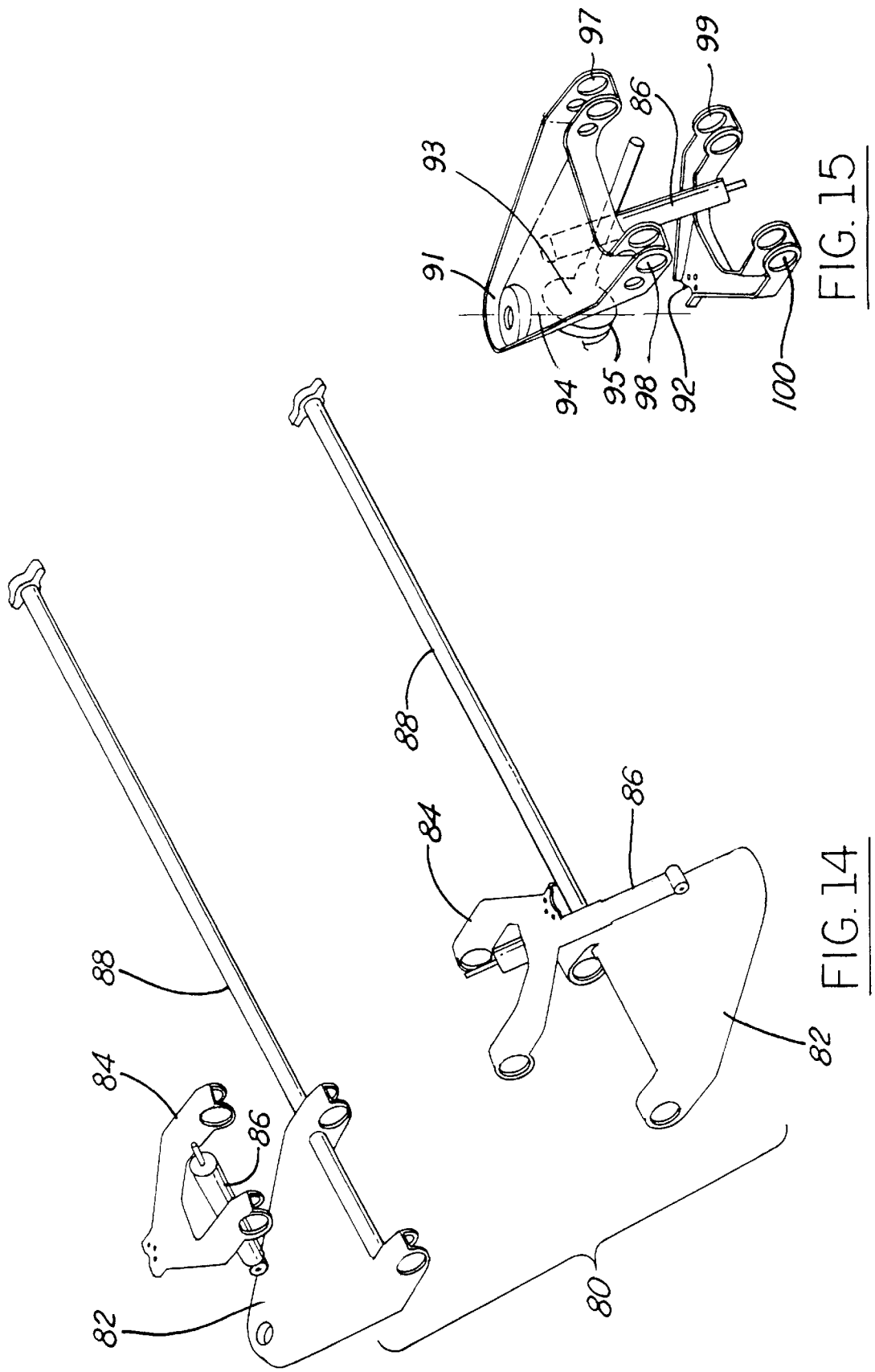

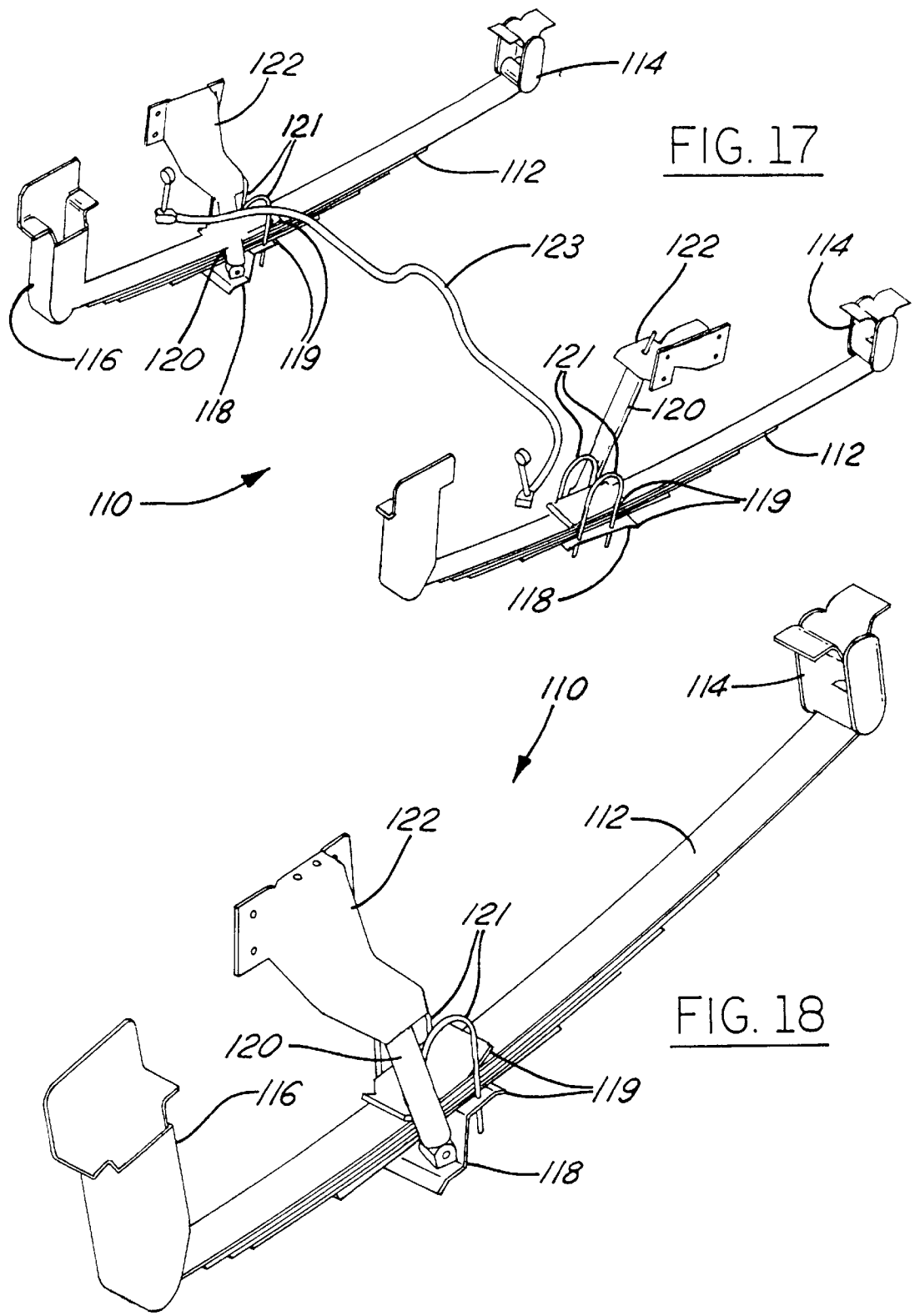

FRAME STRUCTURE FOR SPORT UTILITY VEHICLE OR LIGHT TRUCK

TECHNICAL FIELD

The present invention relates to improved structural and operational components for sports utility vehicles and light truck vehicles.

BACKGROUND ART

Automotive and vehicle manufacturers today are striving to contain and/or reduce costs and meet global competition. In order to meet these goals, the automotive and vehicle manufacturers have tried various solutions. These solutions include reducing the mass and thus weight of the vehicles where possible or appropriate, reducing the number of individual and component parts of a vehicle, incorporating new manufacturing techniques, substituting different materials, particularly lighter weight materials, redesigning parts to reduce their weight, down-sizing the vehicle for its individual components, and applying design techniques that result in more efficient structures and use of materials. One of these design techniques also involves improving the aerodynamics of the vehicle and thus reducing their drag. Various improvements have also been made in vehicle engines and powertrain technology which are directed to meeting fuel economy standards.

The majority of parts for most vehicles are made from steel materials. Steel has many proven advantages, such as low cost, excellent manufacturability, recyclability, and crash energy management capability. The redesign of steel parts and the ability to make the parts from various types, gauges, and strengths of steel materials, have helped create automobiles and vehicles having lower overall vehicle weight.

The body shell of a vehicle (a/k/a "body-in-white") is the skeletal structure to which various subsystems subsequently are attached. These subsystems include the engine and drivetrain, suspension and wheels, interior components, and exterior body components, such as doors, glass, hood, and trunk lid. Since the body-in-white (BIW) typically represents approximately 20–25% of the total weight of a vehicle, efforts have been made to reduce the weight of the BIW. Any reductions in weight or use of different structures and materials, however, have to be done in cooperation with meeting various structural, rigidity, and dimensional parameters in order to produce a satisfactory vehicle.

It is an object of the present invention to provide improved vehicle structures (especially BIWs) for sport utility vehicles (SUV) and light truck vehicles. It is another object of the present invention to provide improved structural and operational components for such vehicle structures.

It is also an object of the present invention to provide vehicle structures for SUVs and light trucks which utilize a plurality of common components and thus which are less expensive to manufacture and assemble. At the same time, it is still another object of the present invention to provide improved structures and utilize common components while at the same time maintaining satisfactory performance characteristics of the vehicles.

It is a further object of the present invention to provide a vehicle structure which has fewer and more standard components than known structures and which still has satisfactory performance characteristics which meet or exceed vehicles of the same type known today. It is another object of the present invention to provide SUV and light truck structures which have less mass and which are improvements over known structures and still meet requisite standards of structural integrity, crash worthiness and durability.

These and other objects, purposes and advantages of the present invention will become apparent from the following description thereof, when viewed in accordance with the attached drawings and appended claims.

SUMMARY OF THE INVENTION

The present invention relates to systems and structures for improving the manufacture and assembly of various vehicles, particularly sport utility vehicles (SUV) and light trucks. The invention provides vehicle structures which utilize common components, both in the front and rear ends of the same vehicle, as well as in different vehicles. The use of common components allows manufacture and assembly of different vehicles on the same production line, and reduces tooling investment, component costing and expense, and assembly time. At the same time, the present invention maintains performance characteristics comparable to or exceeding vehicles of the same class.

In particular, a common structural subframe system is used for both the front and rear ends of an SUV. The common subframe includes right and left rail members, a cradle member and a bumper member, and the subframe also absorbs crash and bumper loads. The structural subframes carry the suspension, steering and powertrain components in the front of the vehicle, and the suspension and differential in the rear of the vehicle. The center section of the SUV vehicle preferably is a monocoque structure which provides a savings in mass and weight over a fully framed vehicle. The monocoque structure comprises the center section of the SUV and is bolted on to the structural subframe systems in the front and rear of the vehicle making it a "hybrid" vehicle structure.

The same structural subframe is also used for the front portions of light truck structure in accordance with the present invention. The light truck structure can be a pickup design with either a standard cab or an extended cab. The remainder of the frame of the light truck vehicle utilizes a conventional frame structure.

In addition, the present invention provides a unique suspension system for the SUV in which the same components can be used for both the front and rear wheel suspension systems. Moreover, that same suspension system can be used for the front suspension in the light truck structures. The suspension system includes a double wishbone suspension with torsion bars, hydraulic shocks, and anti-roll bars. The suspension is mounted directly to the structural subframe for ease of installation and off-line adjustment.

The engine mounting system and the rear differential mounting system share the same locations on the common subframe. The structural bumper crossmember on the subframe includes mountings for the radiator support, head lights, and other front end accessories for the front end, as well as mountings for the tail lights and other rear end accessories for the rear end.

A front subframe strut joint is integrated into the "A" pillar of the vehicle as part of the upper and cowl joint. A smooth transition of the load path is provided from the front subframe strut through the roof rail. The body structure for both the SUV and light truck structures are common for the vehicles from the "A" pillar forward. With a continuous rail system, the same joints and connecting mechanisms can be used for both the SUV and light truck structures.

A unique structure combining a triangulation of the "C" and "D" pillars provides optimum loading through the roof rail in the SUV. Another triangular structural system includes the "A" pillar in combination with a front rail member and cowl strut member.

In the design of the vehicle in accordance with the present invention, certain structural performance targets are first selected. These targets generally include the mass (weight) of the body, as well as the static torsion, static bending, and first modes of vibration (frequency). The type of material used for the vehicle body is also selected, together with applicable wheel base, exterior and interior dimensions, curb weight, and towing capacity. Preferably, the vehicle structures are made primarily from a steel material.

The present inventive structural and operational components for the SUV and light truck vehicles meet structural performance targets comparable with or exceeding standards for SUVs and light trucks in the same classes on the market today. The present invention also provides satisfactory crash test results, thus creating a useable and producible improved structure for final vehicle production.

With the present invention, a highly rigid hybrid body with minimal mass can be created. The competing requirements of safety (crash worthiness) rigidity, cost, and weight reduction are balanced. New and improved bodies-in-white for SUVs and light truck vehicles are created. The bodies-in-white have tight packages with minimal outer space and maximum internal useable space, and meet customer and manufacture needs of comfort, manufacture and efficiency, fuel efficiency, and safety.

In addition, the techniques used for manufacture and assembly of the body-in-white and its components for the SUVs and light truck structures are those conventionally in use today. Thus, in this manner, the invention can have immediate use and application and the benefits thereof can be promptly provided to and secured by manufacturers, their customers, and other members of the public.

These and other features, details, and characteristics of the present invention will become apparent from the following description of the invention, when viewed in accordance with the attached drawings and appended claims.

BRIEF DESCRIPTION OF THE DRAWINGS

FIGS. 6 and 7 illustrate perspective views of a complete front subframe system and a partial front subframe system, respectively, made in accordance with the present invention;

FIG. 14 illustrates a front suspension system for use with vehicles in accordance with the present invention;

FIG. 15 is an exploded view illustrating a portion of the front suspension system shown in FIG. 14;

FIGS. 17 and 18 illustrate a full and partial, respectively, rear suspension system for light truck structures in accordance with the present invention;

BEST MODE(S) FOR CARRYING OUT THE INVENTION

Figure 1:
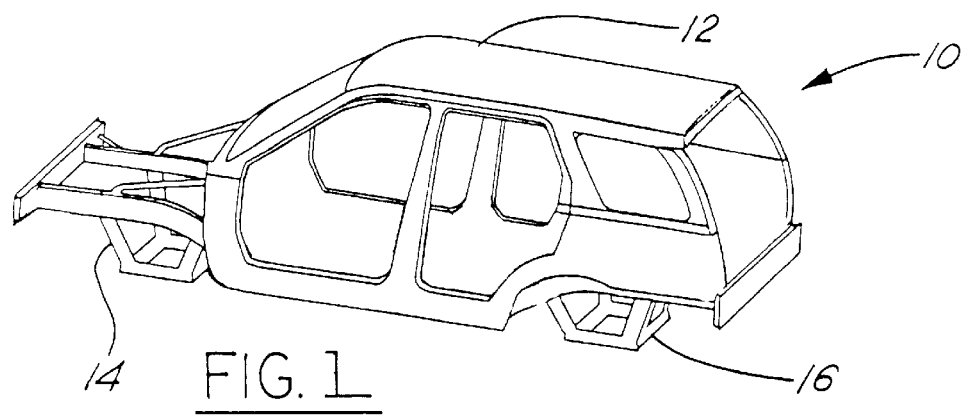
FIG. 1 illustrates a hybrid structure for a sport utility vehicle made in accordance with the present invention.
Figure 2:
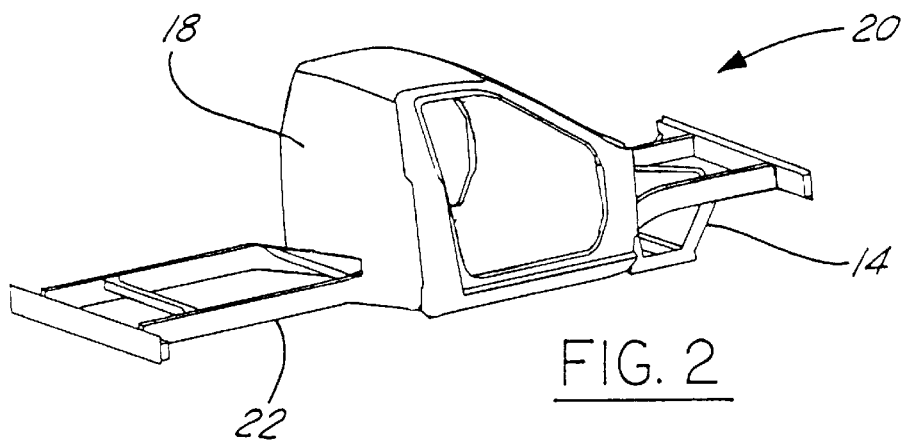
FIG. 2 illustrates a structure for a hybrid light truck vehicle made in accordance with the present invention.
Figure 3:
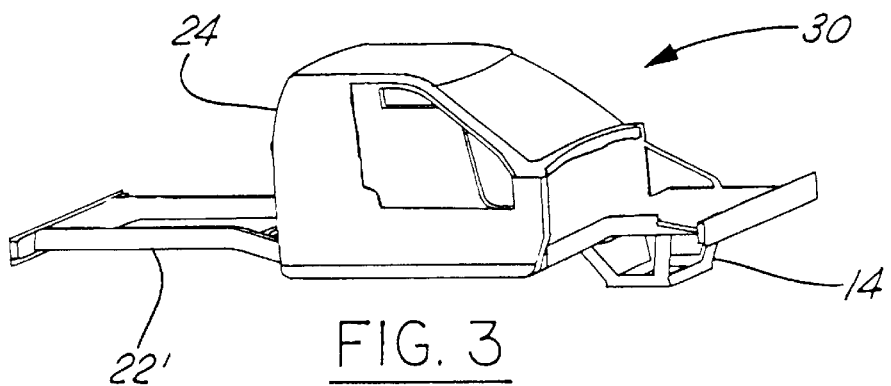
FIG. 3 illustrates a hybrid structure for a light truck vehicle having an extended cab made in accordance with the present invention.

FIGS. 1, 2 and 3 illustrate various hybrid body structures made in accordance with the present invention. These body shell structures are commonly called "body-in-white" structures and are the skeletal structure to which various subsystems of the vehicle subsequently are attached. The subsystems include the engine and drivetrain, suspension and wheels, interior components, and exterior body components, such as doors, hood, glass, and trunk lid. The body-in-white typically represents approximately 20–25% of the total weight of a vehicle and must meet various structural, rigidity, and crash worthiness standards in order to be used in production for a vehicle today.

FIG. 1 illustrates a hybrid body shell 10 for a sport utility vehicle (SUV). FIG. 2 illustrates a hybrid body structure 20 for a standard cab light truck structure. FIG. 3 illustrates a hybrid body structure 30 for an extended cab light truck structure.

Referring to FIG. 1, the SUV body structure includes a body member 12, a front structural subframe system 14, and a rear structural subframe system 16. The standard cab body structure 20 includes a cab body member 18, a front subframe system 14, and a frame structure 22. The extended cab body structure 30 includes a body member 24, a front subframe system 14, and a frame structure 22'.

As evidenced by the use of common reference numerals, the front subframe system 14 used with all three of the vehicle structures 10, 20, and 30 is a common structural subframe system. In addition, the standard cab and extended cab body structures 20 and 30, respectively, utilize frame structures 22 and 22' which have the same components and differ only in length. Further, as pointed out below, the rear subframe system 16 used with the SUV is the same as the front subframe system 14 used with all of the vehicles.

Figure 4:
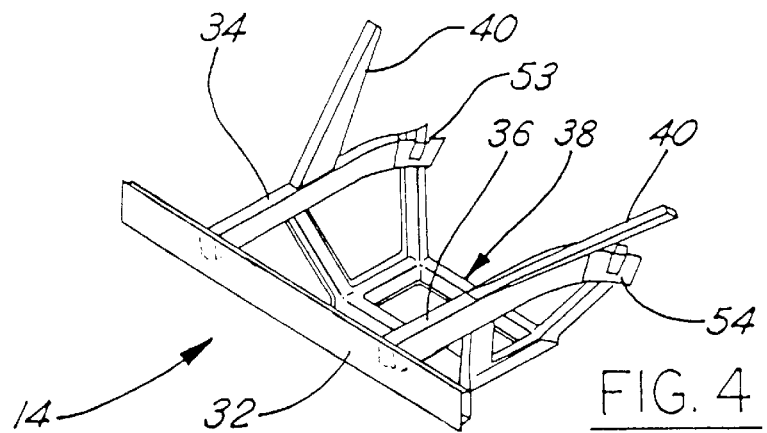
FIG. 4 illustrates a vehicle front end subframe system made in accordance with the present invention.
Figure 5:
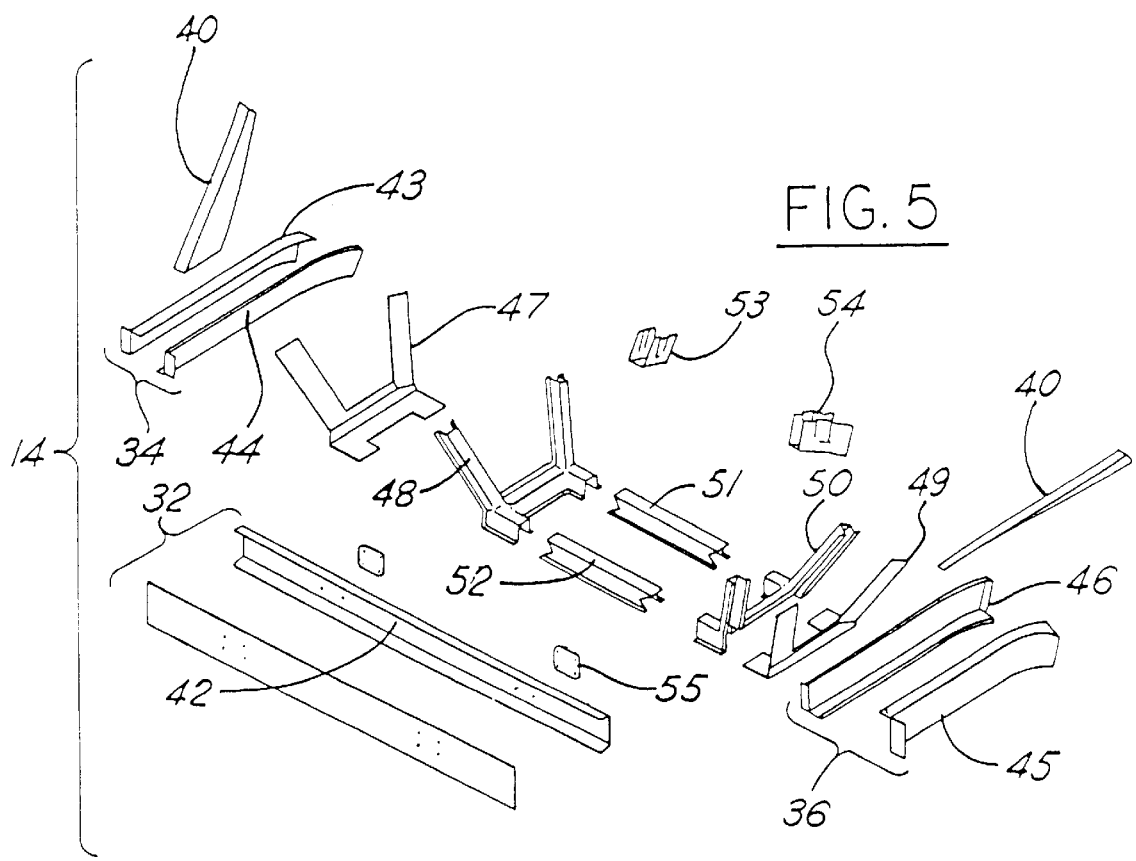
FIG. 5 is an exploded view of the front subframe system illustrated in FIG. 4.

FIGS. 4–7 illustrate the front structural subframe system 14 used with the SUV and light truck structures. In this regard, FIG. 4 illustrates the assembled front subframe system, FIG. 5 is an exploded view depicting the various parts and components of the front subframe system, FIG. 6 is a perspective view illustrating the assembled front subframe system, and FIG. 7 is a perspective view illustrating a portion of the front subframe system.

The front subframe system 14 is a structural subframe which absorbs crash and bumper loads. The system 14 includes a front bumper member 32, a right-hand rail member 34, a left-hand rail member 36, a cradle member 38, and a pair of strut members 40.

As shown in FIG. 5, the front bumper member 32 includes an outer bumper member 41 and an inner bumper member 42. The right-hand rail member 34 includes an outer rail member 43 and an inner rail member 44. The left-hand rail member 36 includes an outer rail member 45 and an inner rail member 46.

The cradle member 38 includes a number of various components, including a right front outer member 47, a right front inner member 48, a left front outer member 49, and a left front inner member 50, as well as a pair of cross-members 51 and 52. A pair of U-shaped nodes or joint connecting mechanisms 53 and 54 are connected (preferably welded) to the ends of the right rail member 34 and left rail member 36, respectively. The nodes are used to connect the front subframe system 14 to other portions of the body structure.

A pair of plate members 55 are attached to the ends of the right and left rail members 34 and 36, as shown in the drawings. The plate members are used to attach the bumper member 32 to the side rail members.

As indicated above, the same front structural subframe system 14 is utilized for the SUV structure 10 and the two light truck vehicle structures 20 and 30. The subframe system 14 is a structural unit which mounts to a frame-type rail system in an adjacent portion of the appropriate vehicle. This allows the use of a 5 mph bumper system to be combined with a front structural cross-member in the rear portions of the rail members. It is also possible to provide the radiator support, hood hinge mounting brackets, and the headlight mounting brackets on the front subframe system, such as on the bumper member 32 and/or right and left rail members 34 and 36, respectively.

The upper and lower portions of the side rail members of the subframe system 14 are also adapted to mount the suspension structure or system for the SUV. The front subframe system also includes mounting members for mounting the engine in the cradle member 38.

Figure 8:
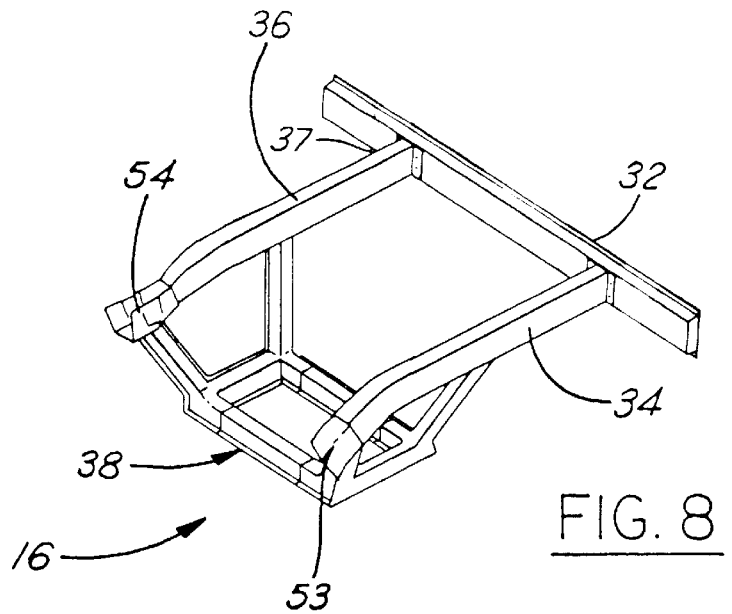
FIG. 8 illustrates a vehicle rear end subframe system made in accordance with the present invention.
Figure 9:
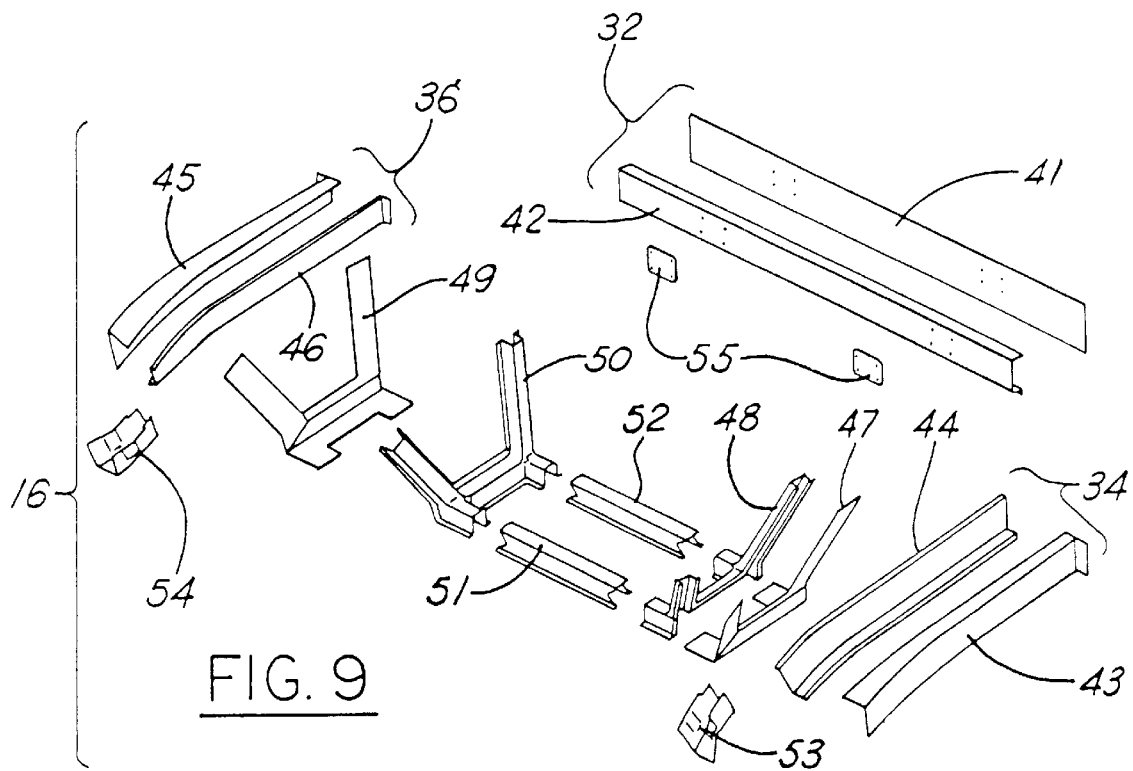
FIG. 9 is an exploded view of the rear subframe system shown in FIG. 8.
Figure 10:
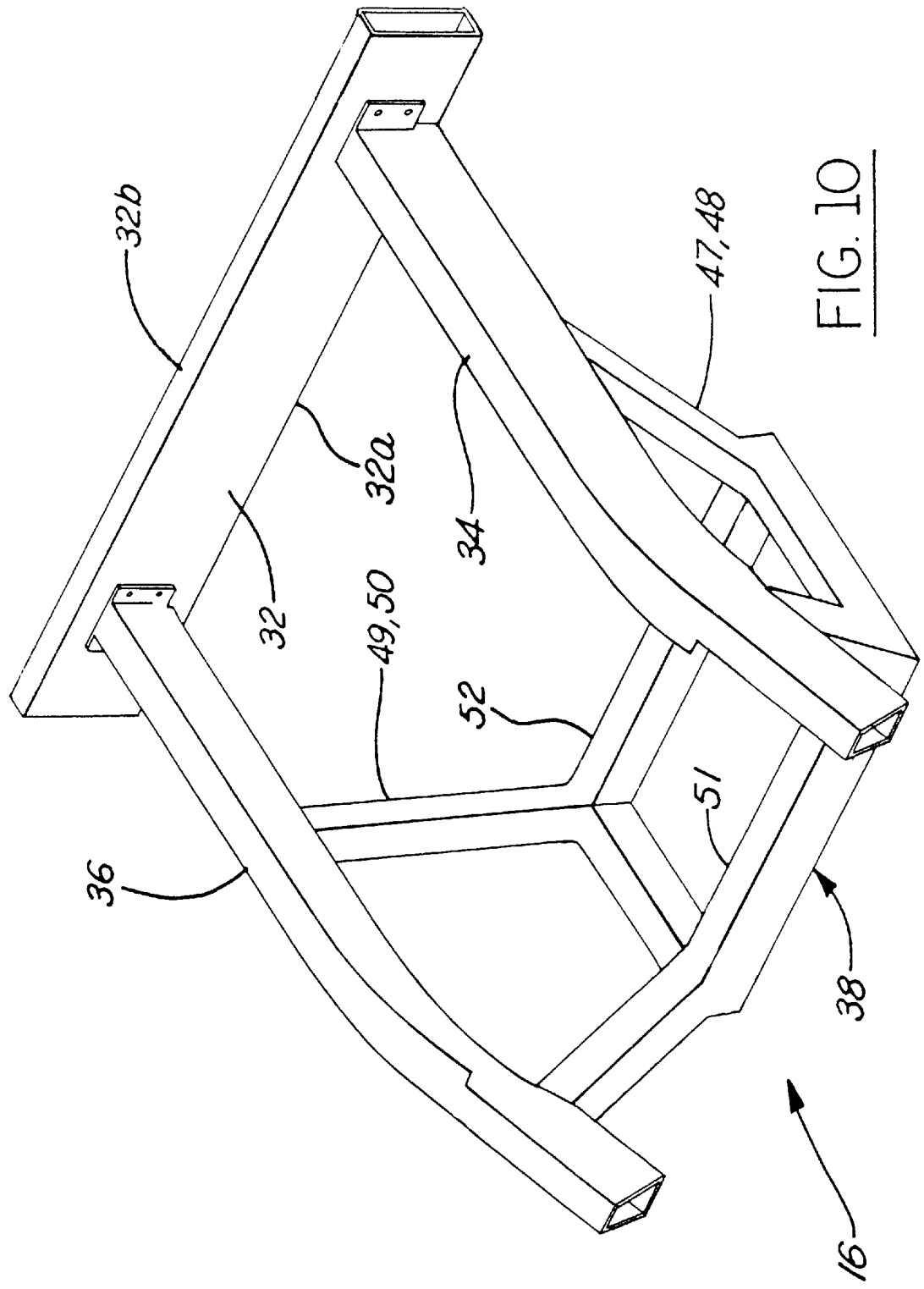
FIG. 10 is a perspective view of a rear subframe system made in accordance with the present invention.

As indicated above, the rear subframe system 16 for the sport utility vehicle is a structural framework and is the same as the front subframe system 14. In this regard, the rear subframe system 16 is shown in FIGS. 8–10. FIG. 8 is an outline-type perspective view of the subframe system 16, FIG. 9 is an exploded view depicting the various components of the subframe system 16, and FIG. 10 is a perspective view of the subframe system 16.

In the front subframe system 14, members and brackets for mounting the accessories and components which normally fit in or on the front end of a vehicle are attached to the front subframe system. These components include the engine of the vehicle, the front suspension, the steering system, the radiator and cooling system, headlights, hood hinges, and the like.

Since the rear subframe system 16 is the same as the front subframe system 14 and includes the same components, the various members and components shown in FIGS. 8, 9 and 10 are referenced by the same reference numerals. In this regard, the rear subframe system 16 includes a rear bumper member 32, a first side rail member 34, a second side rail member 36, and a cradle member 38. (Cowl struts similar to members 40 shown with respect to FIGS. 4–7 are not used with the rear subframe system.)

The bumper member 32 includes an outer member 41 and an inner member 42. The first rail member 34 includes an outer member 43 and an inner member 44. The second rail member 36 includes an outer rail member 45 and an inner rail member 46. The cradle member includes a first outer member 47, a first inner member 48, a second outer member 49, a second inner member 50, and a pair of cross members 51 and 52. The rear subframe system 16 also includes a pair of U-shaped joint nodes 53 and 54 connected (i.e. welded) to the side rail members, and a pair of rail plates 55.

The rear subframe system 16 is adapted to house and mount vehicle components normally positioned in the rear of the vehicle. These components include the rear differential, the rear suspension system, the fuel tank, the spare tire, and mounting brackets for rear taillights. In order to provide a common bumper member 32 for use with both the front and rear subframe systems, it is preferable to have all of the mounting holes and brackets associated with the front of the vehicle positioned on one edge 32a of the bumper member, and to have the mounting holes and brackets for the components positioned in the rear of the vehicle on the other edge 32b of the bumper member 32 (see FIG. 10). This means, when the subframe system is being assembled for the vehicle, the bumper member 32 is turned 180° depending on whether the subframe system is going to be used for the front or rear of the vehicle.

Figure 11:
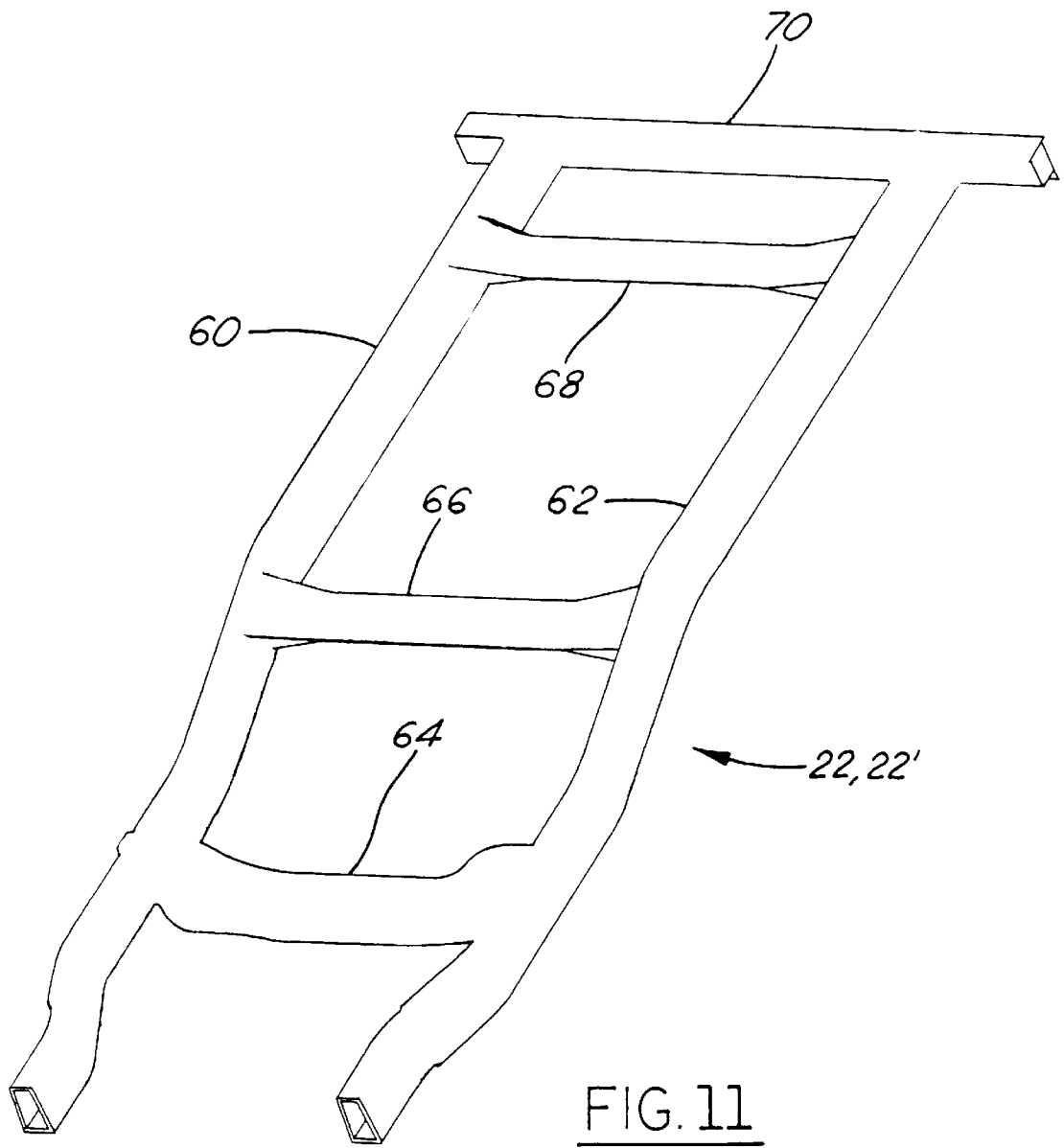
FIGS. 11 and 12 illustrate a full and a partial frame system, respectively, for light truck vehicles.
Figure 12:
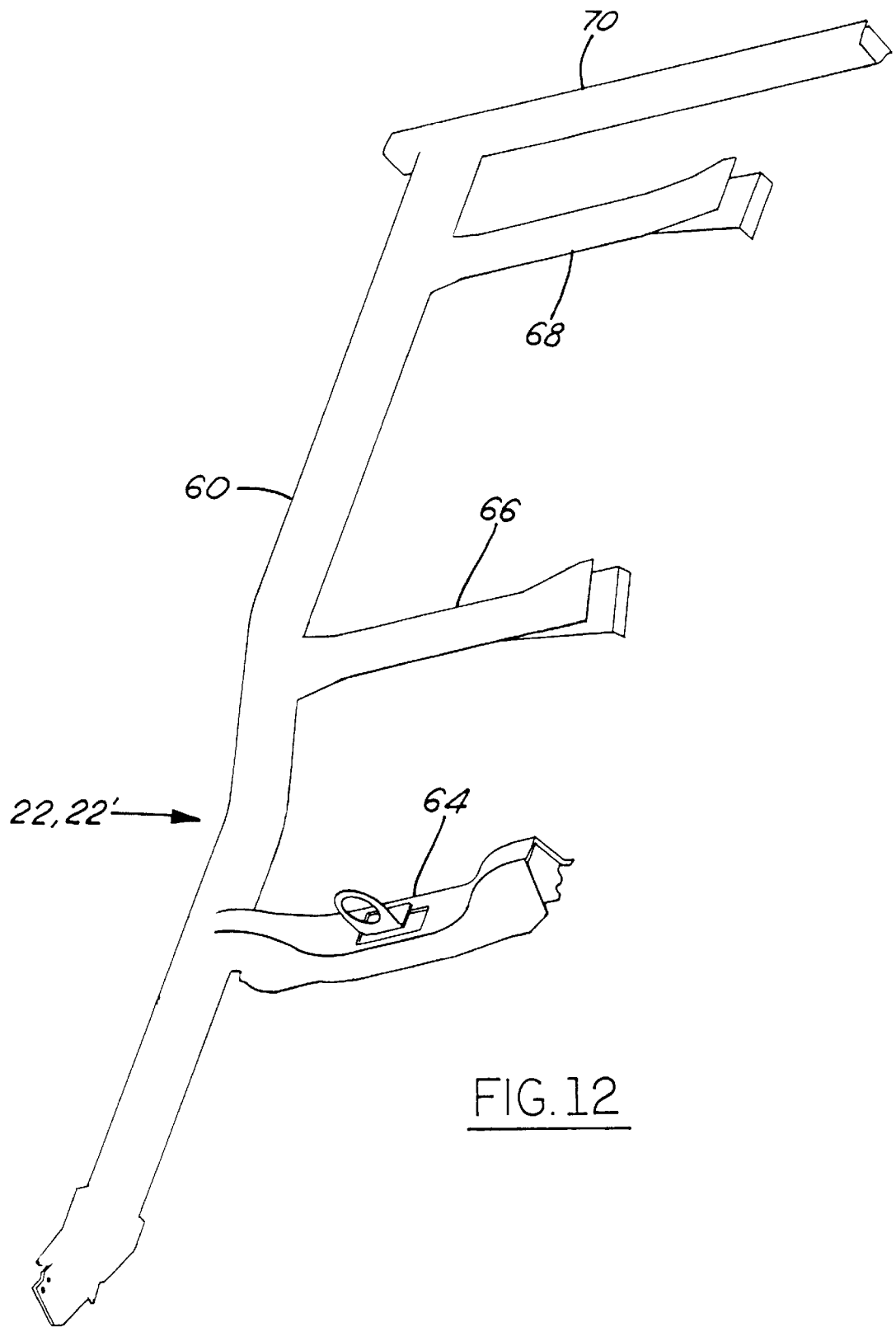

A relatively conventional frame system is used for the mid and rear portions of the light truck structures 20 and 30. This frame structure is shown in FIGS. 11 and 12, with FIG. 11 showing a complete frame structure and FIG. 12 showing a partial frame structure. As indicated, substantially the same frame structures are used for both the standard cab and extended cab light truck structures. The two structures 22 and 22' use the same components with the only difference being the length of the side rail members.

The frame structures 22 and 22' include a right rail member 60 and a left rail member 62. Several cross members are positioned between the two rail members 60 and 62. These cross-members include a torsion bar cross-member 64, and a pair of bed support and fuel tank support members 66 and 68. The spare tire also mounts on the support members 66 and 68. A rear bumper 70 is also attached to the ends of the rail members. (Preferably, the bumper member is the same as bumper member 32 referred to above).

Figure 13:
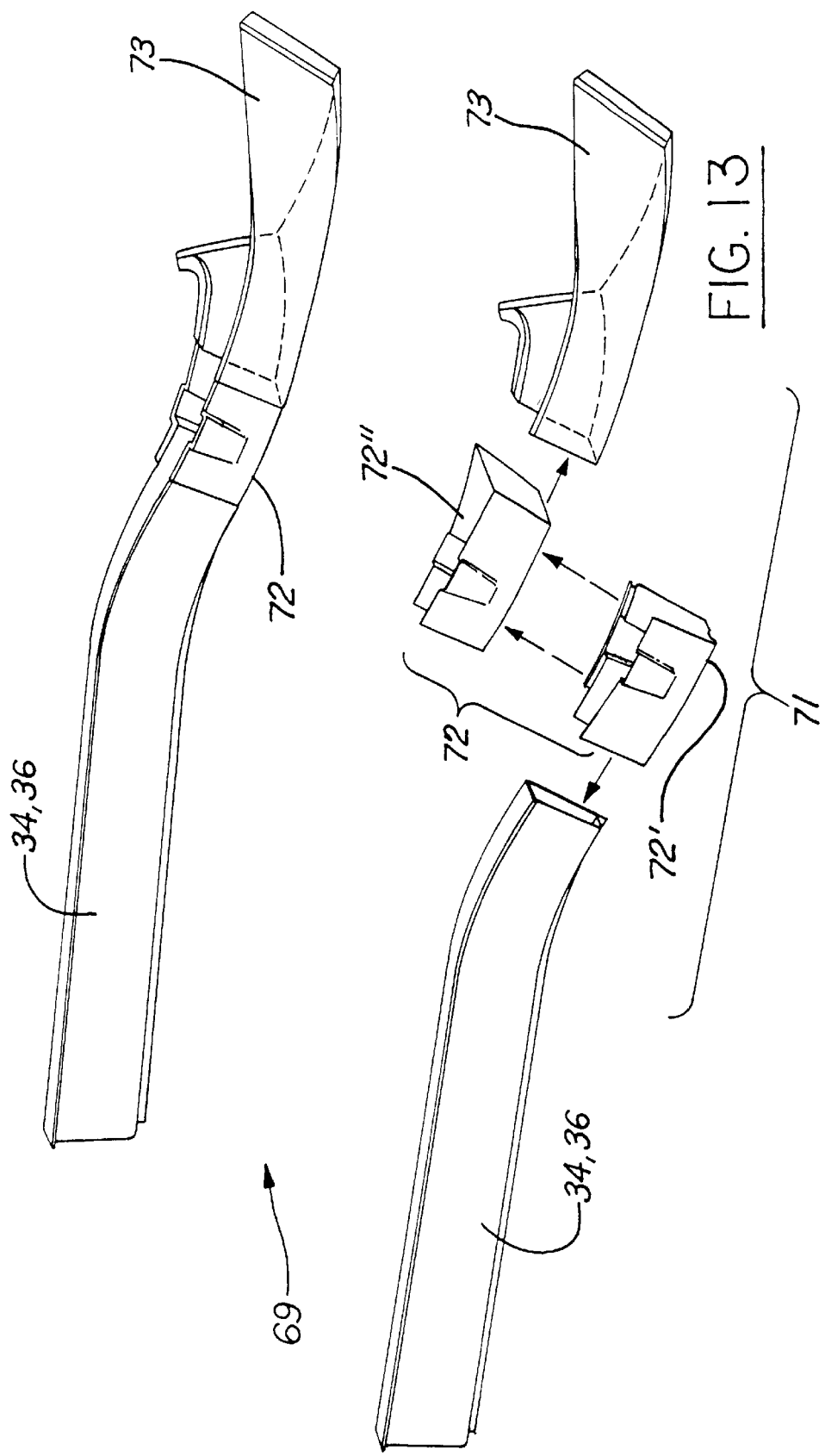
FIG. 13 depicts the joint or connecting mechanism between a subframe system and a frame structure in accordance with the present invention.

FIG. 13 illustrates the joint or connection between a subframe system and a frame structure. A completed joint is indicated by the reference numeral 69, while an exploded view of the joint structure is indicated by the reference numeral 71. A U-shaped node structure 72 is used to connect a torque box member 73 on the SUV body structure to a rail member 34 or 36 of a subframe structure. The node structure 72 includes a U-shaped joint member 72' which is welded to the rail member 34 or 36, and a U-shaped joint member 72"

which is welded to the torque box member 73. The two joint members 72' and 72" are bolted together in order to hold the subframe system to the body structure. The node structure 72 is preferably made of steel components which can either be stamped or hydroformed.

For light truck structures, the system for connecting the body structure, frame structure (22 and 22') and front subframe system together uses a W-shaped member formed in the bottom of the body structure. The side rail members (60 and 62) are welded to the W-shaped member and a torque box member. The torque box member in turn is welded to a U-shaped joint member (like member 72"), which is bolted to a U-shaped joint member connected (welded) to the rail members of the front subframe system. The W-shaped member can be stamped or cast.

The use of common components in the subframe systems for both the front and rear portions of a sport utility vehicle and for the front portions of both the SUV and light truck structures provides a significant advantage in the manufacture and assembly of the vehicles. With common components, the investment necessary for tooling to produce the components is significantly reduced. The cost of the components themselves, as well as the expense of manufacturing them, are also reduced. In addition, the time needed to assemble and connect the various components together to form the subframe systems and the time necessary to incorporate the subframe systems into the vehicle, are also significantly reduced.

The front suspension systems utilize the same components and are also the same for the sport utility vehicles and the light truck vehicles in accordance with the present invention. In addition, the front and rear suspension systems for the sport utility vehicle have the same components and are substantially the same.

In this regard, the preferred front suspension system used with the SUV and light truck vehicles in accordance with the present invention is shown in FIGS. 14 and 15. The suspension system is indicated by the reference numeral 80. The suspension system includes two pairs of wishbone members 82 and 84, shock members 86, and a pair of torsion bar spring members 88. The wishbone members 82 and 84 are connected (bolted) to the subframe system, while the shock members are connected at one end to the lower wishbone member 82 and the rail member of the subframe system at the other end.

As better shown in FIG. 15, the pairs of wishbone members incorporate an upper ball joint 91, a lower ball joint 92, a spindle at the kingpin 93, a tie rod ball (not shown), and front and rear bushings 97, 98, 99, and 100. The wheel center is shown by the reference numeral 94 and the knuckle arm balance member is shown by the reference numeral 95.

Figure 16:
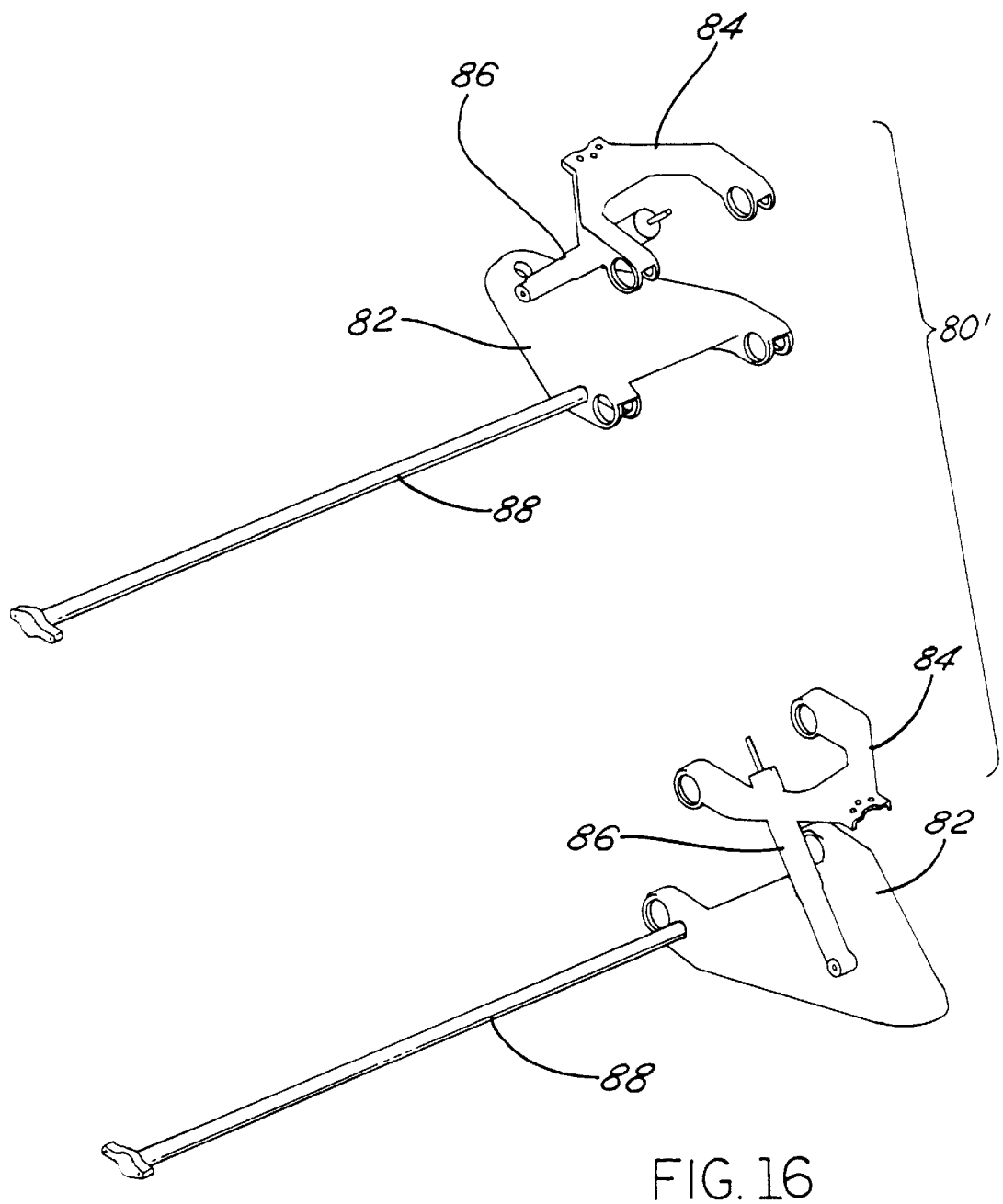
FIG. 16 depicts a rear suspension system for a sport utility vehicle in accordance with the present invention.

The rear suspension system for the sport utility vehicle utilizes the same components as the front suspension system. This is shown in FIG. 16. In that Figure, the parts and components are the same as the front suspension system 80 and are indicated by the same reference numerals. The rear suspension system itself is generally indicated by the reference numeral 80'.

The rear suspension systems for the light truck structures 20 and 30 are conventional and are generally shown in FIGS. 17 and 18. FIG. 17 shows an entire rear suspension system, while FIG. 18 shows only a portion thereof. The rear suspension system is indicated by the reference numeral 110. The rear suspension system includes a pair of conventional leaf springs 112, a rear mounting shackle 114, a front mounting shackle 116, a shock mounting bracket 118, and an anti-roll bar 123. A shock member 120 is attached to the shock mounting bracket 118 and in turn is attached to a second shock mounting bracket 122. The mounting bracket 118 includes a pair of support plates 119 and a pair of U-shaped bolts 121.

The rear suspension systems for the light truck vehicles generally use a live axle with leaf springs, hydraulic shocks, and anti-roll bars. This type of rear suspension system is standard on light truck vehicles. This is due to the nature of the use of the truck, and its capabilities off-road, its durability, and its load carrying capacity.

The suspension systems in accordance with the present invention provide a satisfactory ride and handling compromise for the package space utilized in the vehicles. The inventive suspension system also allows the suspension system to be mounted directly to the subframe systems for ease of installation and offline adjustment. Anti-sway bars (not shown) could also be utilized with either the front or rear suspension systems if desired.

Figure 19:
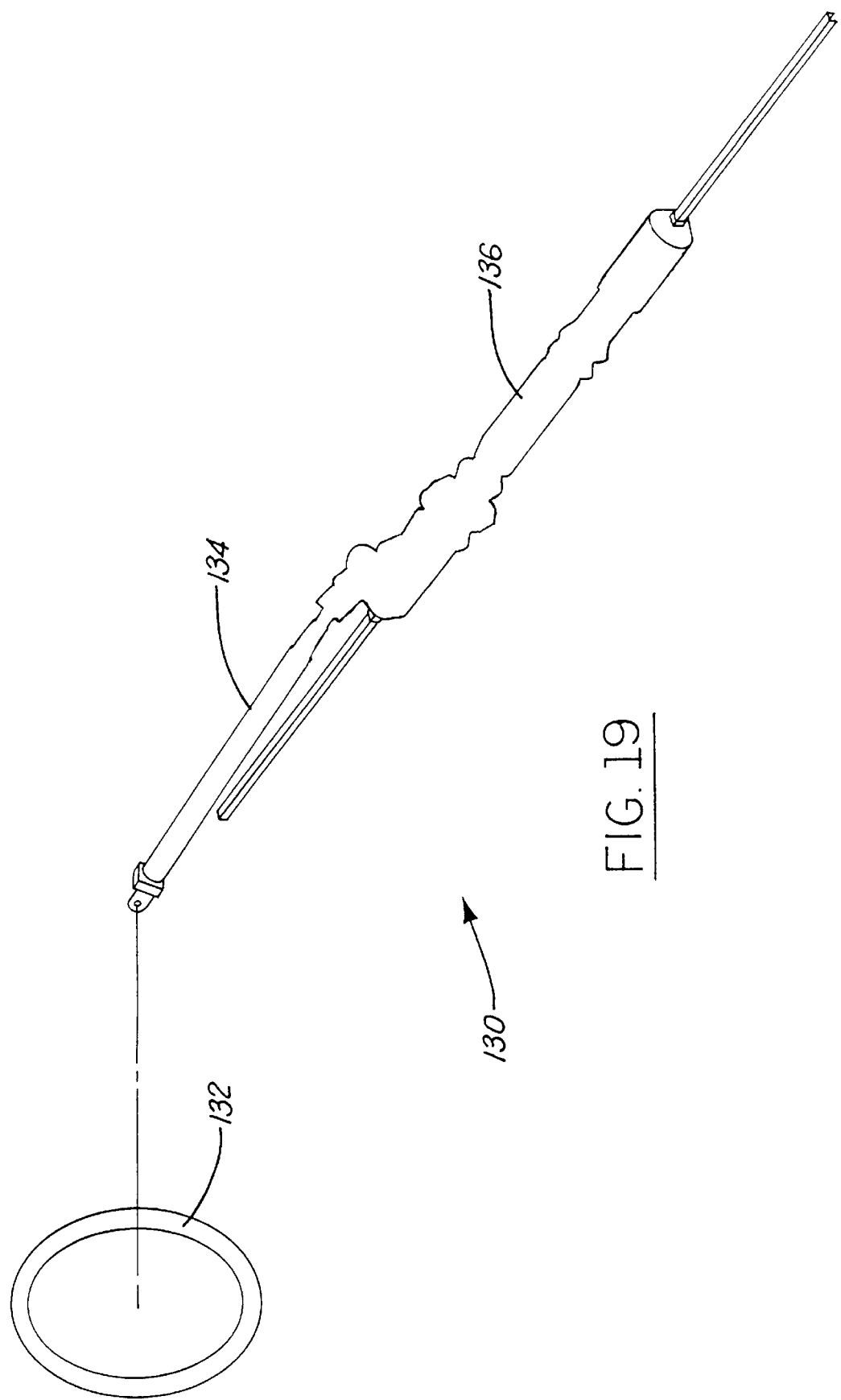
FIG. 19 illustrates a steering system for use with vehicle structures in accordance with the present invention.

The SUV and light truck vehicles have a common steering system also. The steering system 130 is a conventional rack and pinion system and is shown in FIG. 19. The steering system 130 includes a steering wheel 132 connected to an intermediate shaft member 134 and a steering rack member 136. It is understood that any conventional steering system can be used with the vehicles in accordance with the present invention.

Figure 20:
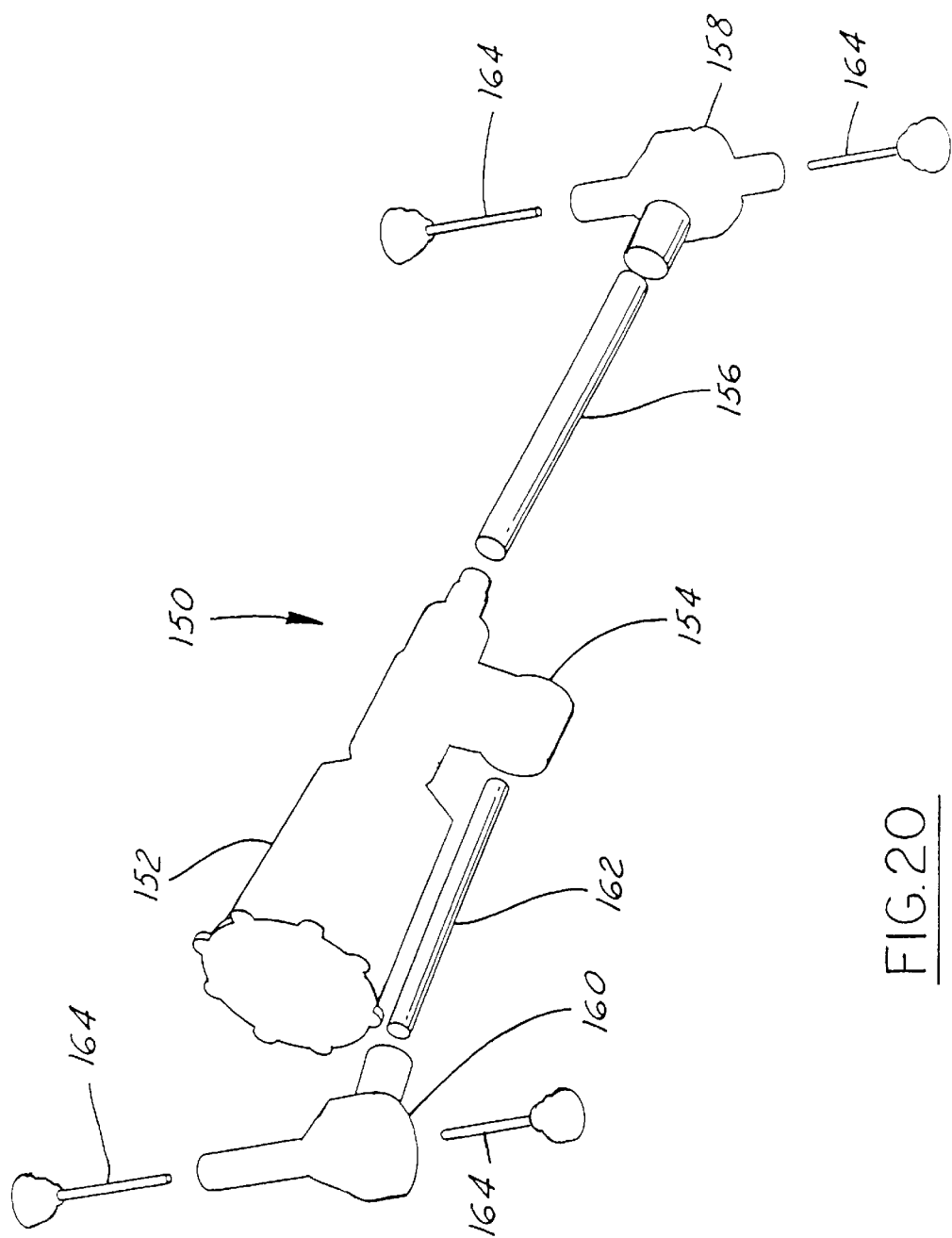
FIG. 20 is an exploded view of a powertrain system for use with the vehicle structures made in accordance with the present invention.

A powertrain system which can be used with the SUV and light truck vehicles is shown in FIG. 20. Again, the same powertrain can be used with all of the vehicle structures 10, 20, and 30. The powertrain system 150 includes a transmission 152, a transfer case 154, a drive shaft 156, a rear differential 158, and a front differential 160, together with a front wheel drive shaft 162. Axle members 164 transfer the power from the engine through the drivetrain to the wheels of the vehicle.

As shown in FIG. 20, preferably a four-wheel drive powertrain system is used for the SUVs and light truck vehicles in accordance with the present invention. However, it is also possible to utilize a two-wheel drive powertrain system. Moreover, the powertrain system used in the present invention can be of any conventional type.

Any type of conventional transmission system can be used, such as a five-speed transmission with transfer case, or a five-speed automatic transmission with viscous coupling. Similarly, the engine 15 used with the vehicle can be any of the V-6 or V-8 engines in use today, and can even be a 4-cylinder engine, if desired.

Figure 21:
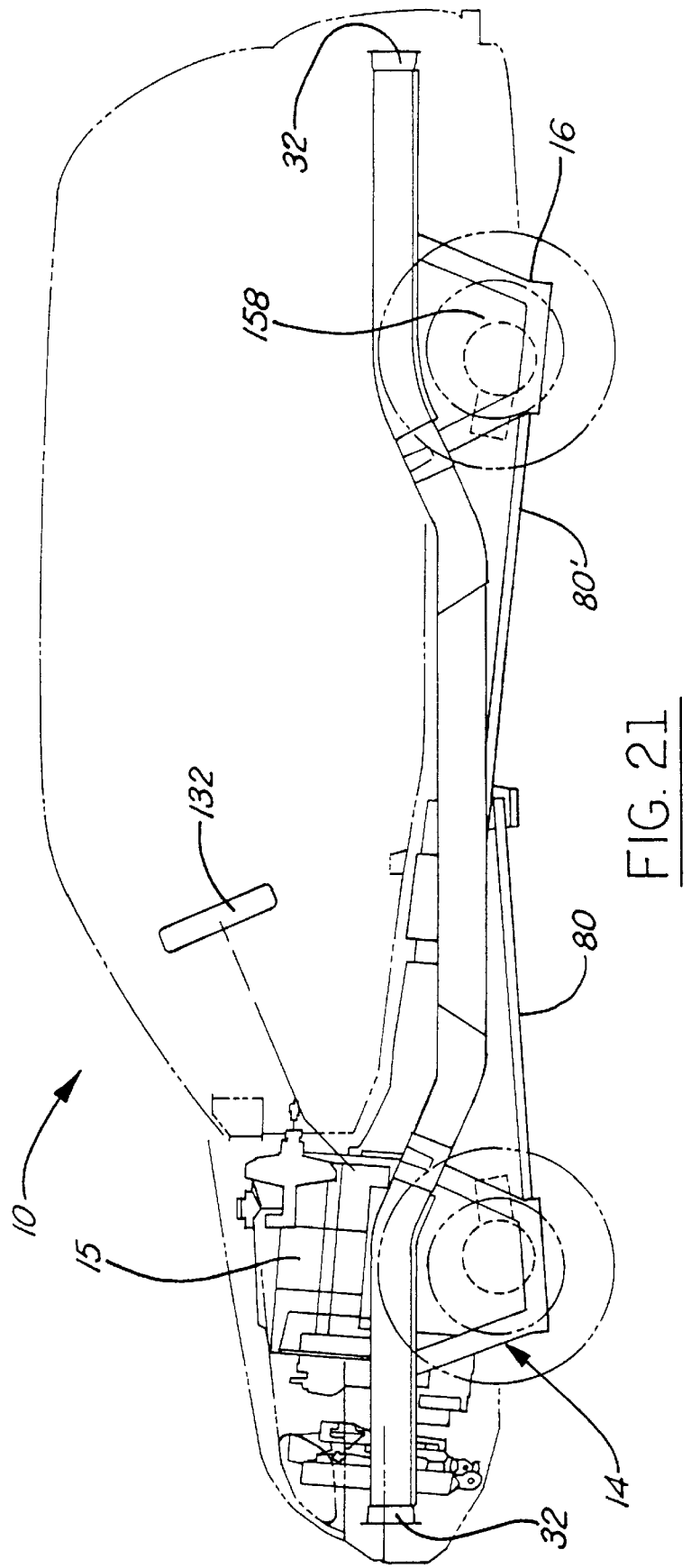
FIG. 21 is a schematic depiction of a sport utility vehicle incorporating the present invention.

FIG. 21 shows the outline of a SUV and illustrates how the front and rear subframe systems and front and rear suspension systems are positioned in the vehicle. The front subframe system 14 is used to support the engine 15, while the rear subframe system 16 is used to support the rear differential 158. The suspension systems 80 and 80' are bolted to the underbody and subframes of the vehicle. Other components of the SUV are standard or conventional and do not need to be separately referenced.

Figure 22:
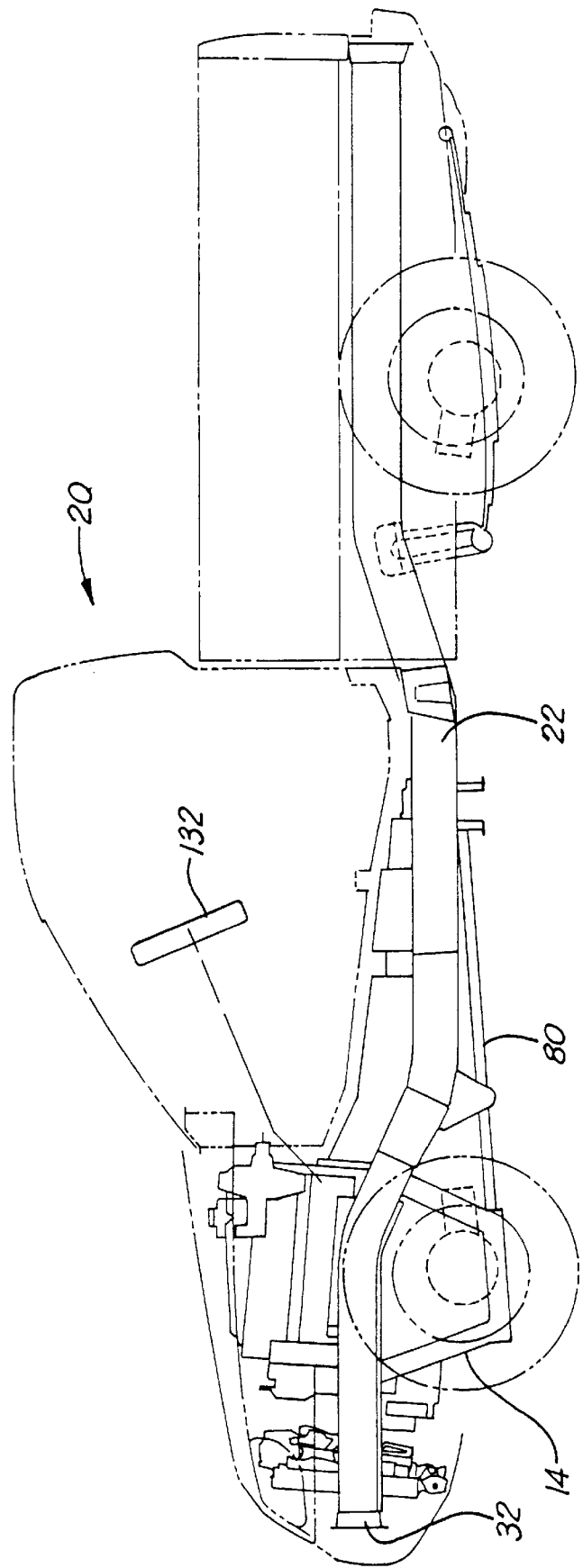
FIG. 22 is a schematic illustration of a standard cab light truck structure incorporating the present invention.

A standard cab light truck structure 20 is illustrated in FIG. 22. This drawing illustrates the use of the front subframe system 14, front suspension system 80, and frame structure 22. The powertrain, wheels, radiator and other conventional components of a pickup truck or other vehicle are also shown in the drawing, but are not separately referenced. Although an extended cab light truck vehicle drawing is not shown, the extended cab light truck vehicle is essentially the same as the light truck structure shown in FIG. 22 insofar as the front subframe system 14, front suspension system 80, and frame structure 22 are concerned.

Figure 23:
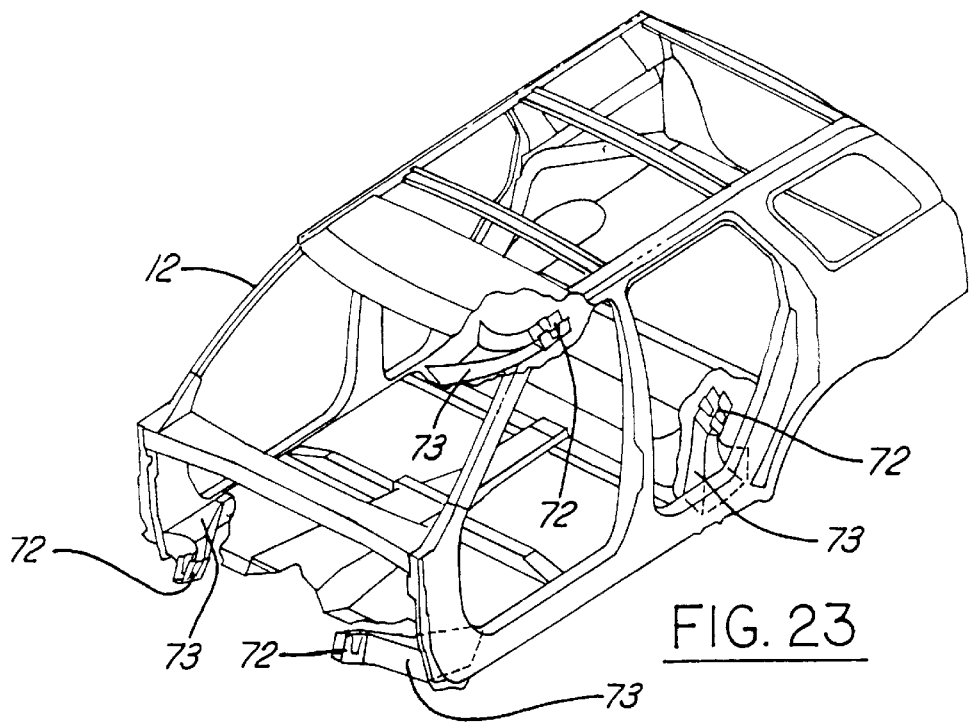
FIGS. 23–25 illustrate, respectively, monocoque body structures for sport utility, standard cab, and extended cab vehicles incorporating the present invention.
Figure 24:
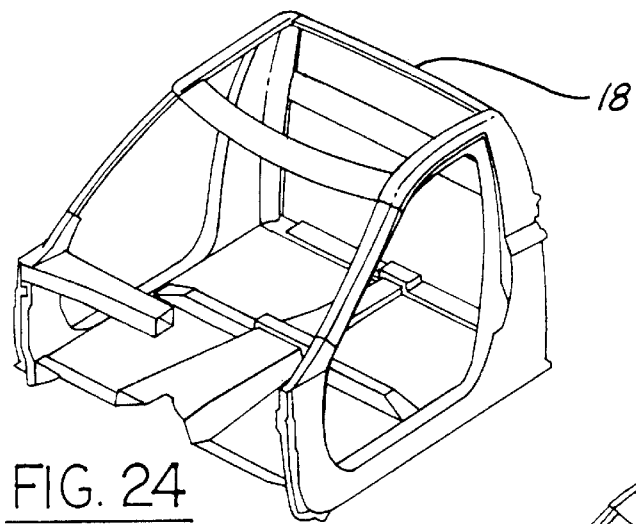
Figure 25:
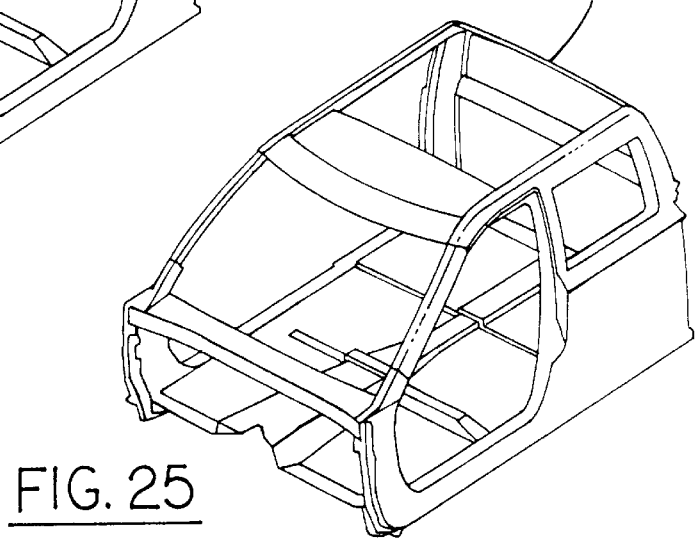

FIGS. 23–25 illustrate the various monocoque body structures preferably used for the three vehicles. FIG. 23 illustrates the body member 12 for the sport utility vehicle, FIG. 24 illustrates the standard cab body member 18 for the light truck structure 20, and FIG. 25 illustrates the body member 24 for the extended cab light truck structure 30. FIG. 23 also shows the four torque box members 73 and nodes 72 preferred for use with the present invention.

Figure 26:
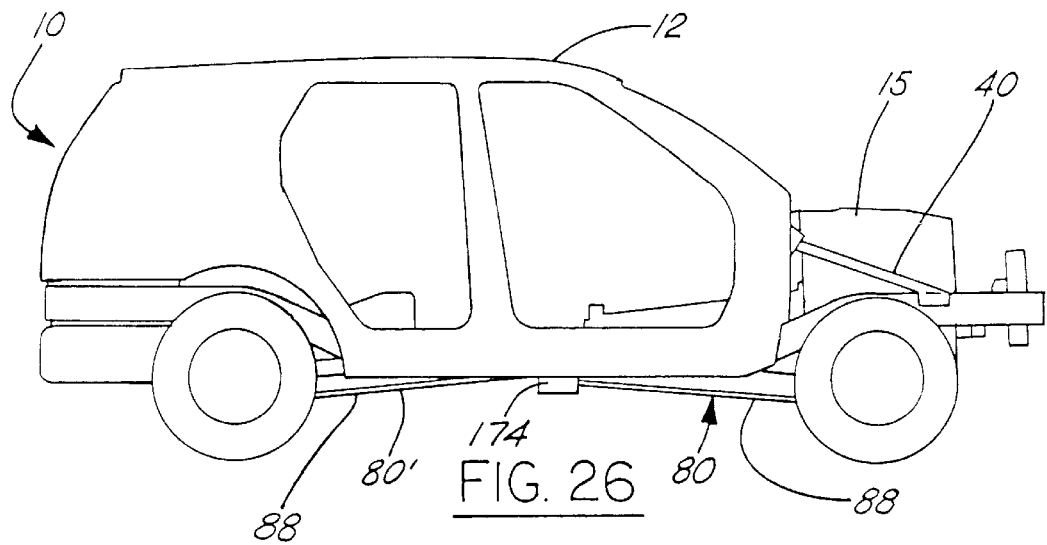
FIG. 26 is a schematic diagram illustrating a sport utility vehicle incorporating the present invention.
Figure 27:
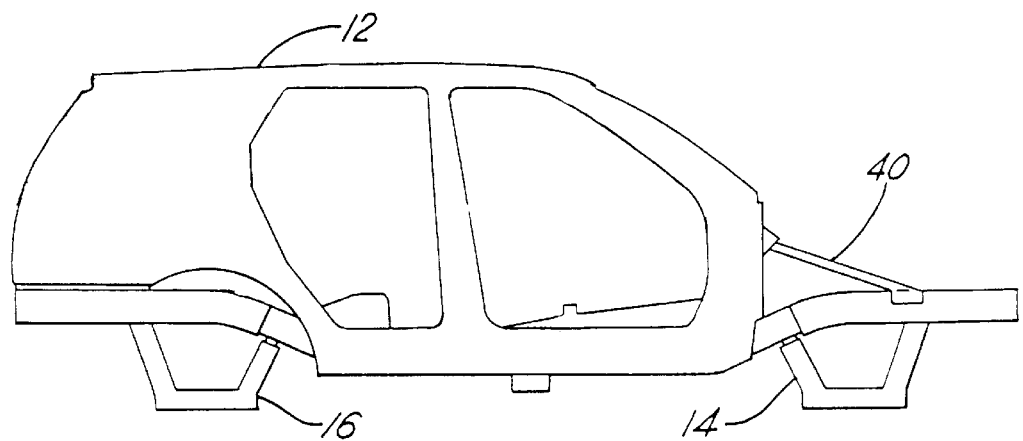
FIG. 27 illustrates the hybrid body structure of the sport utility vehicle shown in FIG. 26.
Figure 28:
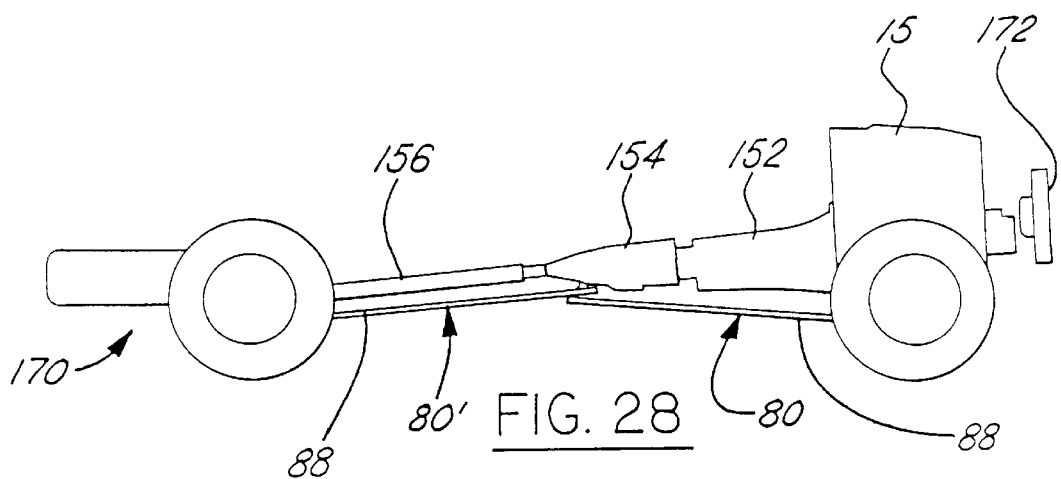
FIG. 28 illustrates the chassis portion of the sport utility vehicle shown in FIG. 26.

A schematic partial view of a hybrid sport utility vehicle in accordance with the present invention is shown in FIG. 26. The body member 12 and chassis member 170, which are assembled together to form the SUV structure 10, are shown in FIGS. 27 and 28, respectively. The front subframe system 14 is attached to the body member 12 as described above, together with cowl strut 40. The rear subframe system 16 is attached to the body member 12, also discussed above. The front and rear suspension systems 80 and 80', respectively, are attached as chassis 170, together with the powertrain components and engine 15. A radiator 172 is also shown in association with the engine 15. A torsional bar mounting cross beam 174 is attached to the underbody of the body member 12 and used to connect the torsion bar springs to the vehicle in the front and rear suspension systems.

Figure 29:
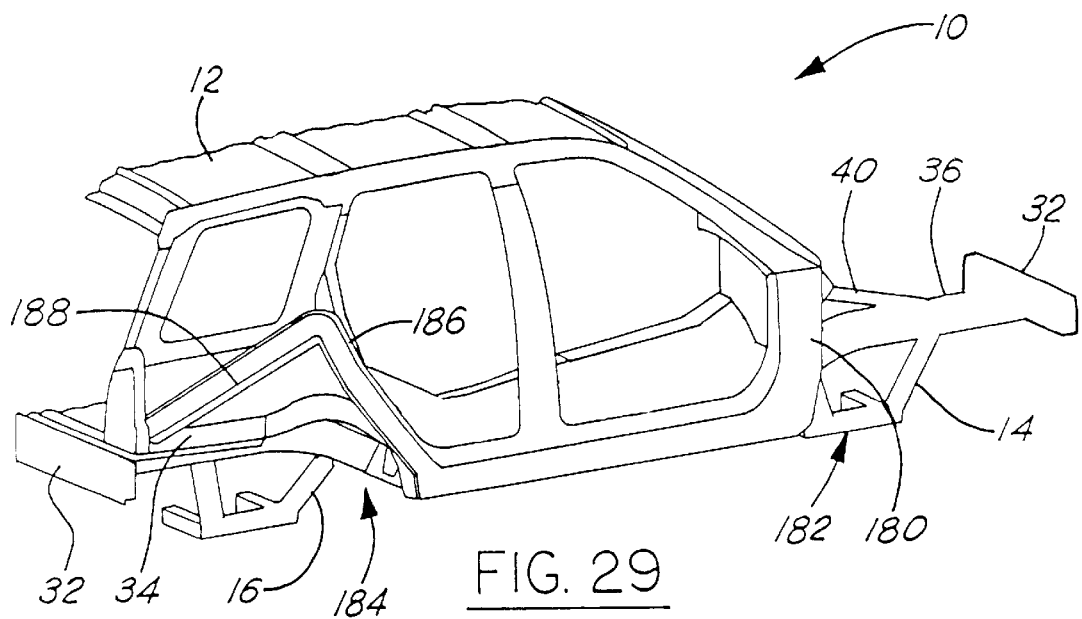
FIGS. 29 and 30 illustrate triangular component structures for in a sport utility vehicle made in accordance with the present invention.
Figure 30:
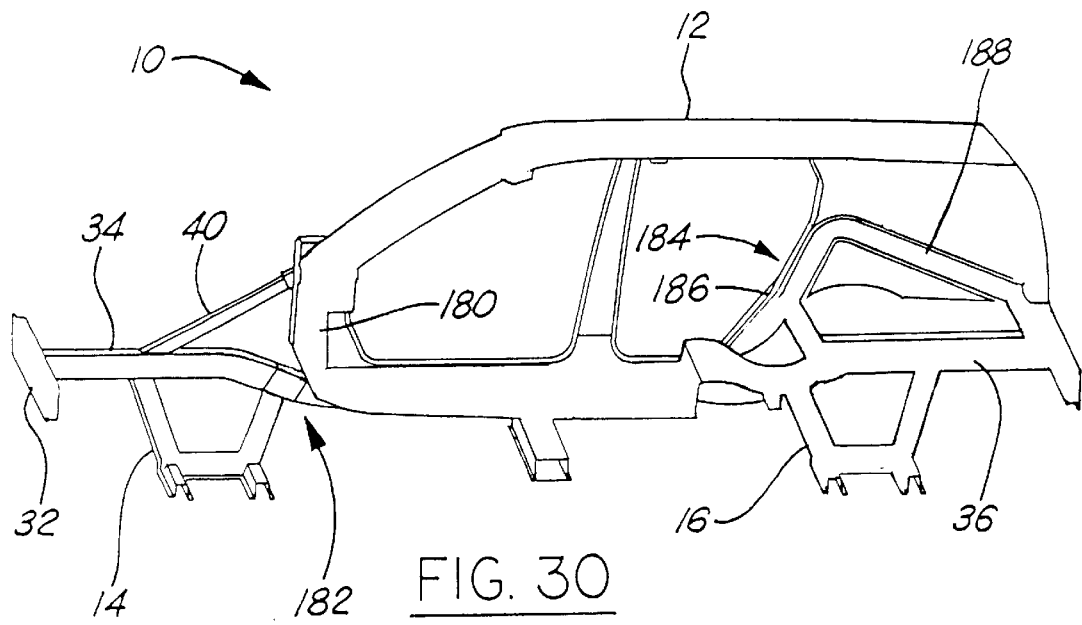

Another aspect of the present invention is shown in FIGS. 29 and 30. The unique framing structure for the SUV provides two triangulation systems which provide acceptable rigidity and strength while reducing the number of components and reducing weight and mass in the vehicle. In the front portion of the vehicle structure 10, the side rail members 34 and 36, together with cowl struts 40, form a triangular structure with the two "A" pillars 180. This triangular structure, which is indicated by the reference numeral 182, distributes loads throughout the body member 12 and vehicle structure in order to absorb crash loads and other loads on the bumper member 32 or front end of the vehicle.

A second triangular structure 184 is provided in the rear portion of the SUV. The upper rail members 34 and 36 of the rear subframe system 16, in combination with the "C" pillars 186 and "D" pillars 188 form the triangular structure 184. The triangular structure 184 distributes loads throughout the body member 12 and associated vehicle structure. With this structure, a shock tower is not needed for the rear wheels of the vehicle.

With the present invention and the use of a significant number of common components and common subsystems, the manufacture of sport utility vehicles and light truck vehicles can be accomplished on the same production line. This also saves tooling and assembly expenses and time relative to production of these two types of vehicles.

As indicated above, the body member and structure of the three vehicles is preferably a monocoque structure in the center of the vehicles. Monocoque structures have less mass and weight than conventional frame structures for vehicles. Thus, the use of a monocoque structure for the center section of the SUV and light truck vehicles minimizes weight and cost of them.

The material used for the SUV and light truck vehicles is preferably a steel material. The structures are designed as load bearing systems. All torsional and bending loads are contained within the structure.

Some of the principle features of the present invention are that the front subframe strut joint is integrated into the upper member of the "A" pillar and the cowl joint. There also is a smooth transition of the load path from the front subframe strut through the roof rail of the body members. The body structure for the vehicles is also common for all of them from the "B" pillar forward. There also is a continuous roof rail section from the "A" pillar to the "D" pillar. The triangular structures 184 which utilize the "C" and "D" pillars provide for optimum loading through the roof rail of the body members.

Moreover, an overlapping closed section front header is preferably used for increased torsional rigidity. Overlapping, closed section roof bows with bracket attachments are also used for the continuous roof rail section, thereby increasing the torsional and bending rigidities. The closed "D" pillar section from the floor of the body member to the header is also provided for increased body stiffness without adding significant mass or weight. A closed section "Jacking Brace" is supplied to distribute loads upward through the "D" pillar to the "C" pillar and the roof bow joint. Finally, overlapping members in the rear floor and the roof rail increase bending and torsional rigidity with minimum impact on mass.

The wishbone mounts for the suspension system in accordance with the present invention are located on the upper and lower portions of the side rail members of the subframe systems in both the front and rear of the SUV. This is accomplished since the front and rear suspension systems for the SUV are the same. Also, the mounting of the engine 15 and the rear differential 158 share the same location on the front and rear subframe systems. In this regard, the same subframe systems are used for the SUV in the front and rear of the vehicle with only minor modifications being necessary for the different attachment locations.

The mounting of the vehicle structure to the side rails is accomplished by rubber mounting for vehicle isolation and durability. Rubber mounting systems are conventionally known in the automobile industry. This type of mounting system provides isolation to the structure from road noise and vibration that is transmitted through the chassis frame.

With the present invention, a more efficient design of a light truck vehicle and a sport utility vehicle are provided, with particular emphasis on mass, structural rigidity, cost, and crash performance. In this regard, vehicles made in accordance with the present invention are comparable to or exceed standards for known vehicles today with regard to people and mechanical package, towing capacity, safety, mass, structural rigidity, cost, and crash performance.

Computer analysis of baseline structures having the structural configurations described above were secured. For the crash analysis, selected tests were performed to verify that the vehicle body, as designed, met the targets of performance and functionality. In particular, the analytical crash testing involved a simulated front crash test, rear crash test, roof crush test, and side impact test. The crash testing was accomplished by computer simulation using Cray computers and Livermore LS Dyna3D software, although other suitable software and hardware could be utilized. A high level of detail of the surfaces, welding, and mounting locations was imputed in order to provide the best possible resolution required to describe the crash events.

A progressive crush of the vehicle was desired with all parts being crushed in sequence from the crash test. In stack up, the rigid bodies in the vehicle were designed to limit the crush and provide component integrity. The front crash analysis was set up in accordance with a test designed by the National Highway and Traffic Safety Association. The roof crush analysis was based on United States Federal Motor Vehicle Safety standards. For the rear crash test, the analysis was based on United States Rear Moving Barrier tests. The conditions for the side impact crash analysis were based on the European Side Moving Barrier tests.

The body structures (body-in-white) in accordance with the present invention were designed to meet structural performance targets and to meet certain functional and performance targets. The functional performance targets include the overall package, crash analysis, and assembly for mass production. The functional performance targets with respect to the package include the wheel base, interior room, weight, and the like. These considerations are also taken into account during the structural performance design aspects.

As mentioned above, the invention, as disclosed and described herein, is particularly related to the design and development of a sports utility vehicle (SUV) and a light truck structure (standard cab and extended cab). Vehicles of the SUV type include the Ford Explorer the Chevrolet Blazer, the Toyota 4 Runner, and the Jeep Cherokee. These all contain V-6 or V-8 engines ard are four-wheel drive. Vehicles today which are comparable to light truck structures include the Ford Ranger, Chevy S-10, Toyota Tacoma and Dodge Dakota.

In addition, certain structural performance targets were selected for the SUV and light truck vehicle structures. These targets included a certain mass or weight, certain static torsion and bending standards, and certain modes of vibration (frequency).

As indicated above, all of the structural and performance standards can be met with a sport utility vehicle or light truck vehicle made in accordance with the present invention. In addition, the present invention provides significant cost savings due to the use of common components and subsystems, both in tooling investment and assembly time and expense.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A sport utility vehicle comprising:
   a. a front subframe system comprising:
      a first cradle structure comprising a base structure and two pairs of generally upstanding first connecting members attached to said base structure;
      a first rail member connected to a first of said two pairs of generally upstanding first connecting members, said first rail member having a first end and a second end;
      a second rail member connected to a second of said two pairs of generally upstanding first connecting members, said second rail member having a first end and a second end;
      a first bumper member connected to said first end of said first rail member and to said first end of said second rail member; and
   b. a rear subframe system comprising:
      a second cradle structure comprising a base structure and two pairs of generally upstanding second connecting members attached to said base structure;
      a third rail member connected to a first of said two pairs of generally upstanding second connecting members, said third rail member having a first end and a second end;
      a fourth rail member connected to a second of said two pairs of generally upstanding second connecting members, said fourth rail member having a first end and a second end;
      a second bumper member connected to said first end of said third rail member and to said first end of said fourth rail member;
   c. wherein said front subframe system and said rear subframe system are substantially the same.

2. The sport utility vehicle of claim 1 wherein said first cradle structure is substantially the same as said second cradle structure.

3. The sport utility vehicle of claim 1 wherein said first and second rail members are substantially the same as said third and fourth rail members, respectively.

4. The sport utility vehicle of claim 1 wherein said first bumper member is substantially the same as said second bumper member.

5. The sport utility vehicle of claim 1 further comprising a first cowl strut member connected to said first rail member and a second cowl strut member connected to said second rail member.

6. The sport utility vehicle of claim 5 wherein said first cowl strut member is substantially the same as said second cowl strut member.

* * * * *